United States Patent [19]

Brazzel

[11] 3,775,946
[45] Dec. 4, 1973

[54] ADSORPTION CONTROL
[75] Inventor: Ronald D. Brazzel, Tyler, Tex.
[73] Assignee: Howe-Baker Engineers, Inc., Tyler, Tex.
[22] Filed: Oct. 13, 1972
[21] Appl. No.: 297,176

[52] U.S. Cl............................. 55/58, 55/62, 55/74, 55/161, 55/179, 55/196, 55/387
[51] Int. Cl............................................ B01d 53/04
[58] Field of Search...................... 55/25, 26, 58–62, 55/74, 161–163, 179, 196, 387

[56] References Cited
UNITED STATES PATENTS

| | | | |
|---|---|---|---|
| 2,944,627 | 7/1960 | Skarstrom | 55/179 X |
| 3,101,261 | 8/1963 | Skarstrom | 55/58 |
| 3,212,236 | 10/1965 | Skarstrom | 55/58 |
| 3,659,399 | 5/1972 | Kauer, Jr. et al. | 55/62 X |
| 3,703,068 | 11/1972 | Wagner | 55/62 X |
| 3,738,087 | 6/1973 | McCombs | 55/62 X |
| 3,226,914 | 1/1966 | Griesmer et al. | 55/62 X |

Primary Examiner—Samih N. Zaharna
Assistant Examiner—Richard W. Burks
Attorney—John G. Premo et al.

[57] ABSTRACT

A gas stream is purified in a two adsorber system, each adsorber having valved input and output flow lines, a valved counterflow line and a valved vent line. Simultaneously actuated in a first sense are the valved input and output flow lines on the first adsorber and the valved counterflow and vent lines on the second adsorber. Simultaneously actuated in a second sense opposite the first sense are the valved input and output flow lines on the second adsorber and the valved counterflow line and the valved vent line on the first adsorber. Responsive to counterflow of the predetermined gas volume after each actuation of the valved lines, any open valved vent line in the system is closed. Responsive to reaching a near minimum in each cycle of decreasing difference in pressure between the two adsorbers the simultaneous actuation of the valved lines is initiated.

11 Claims, 1 Drawing Figure

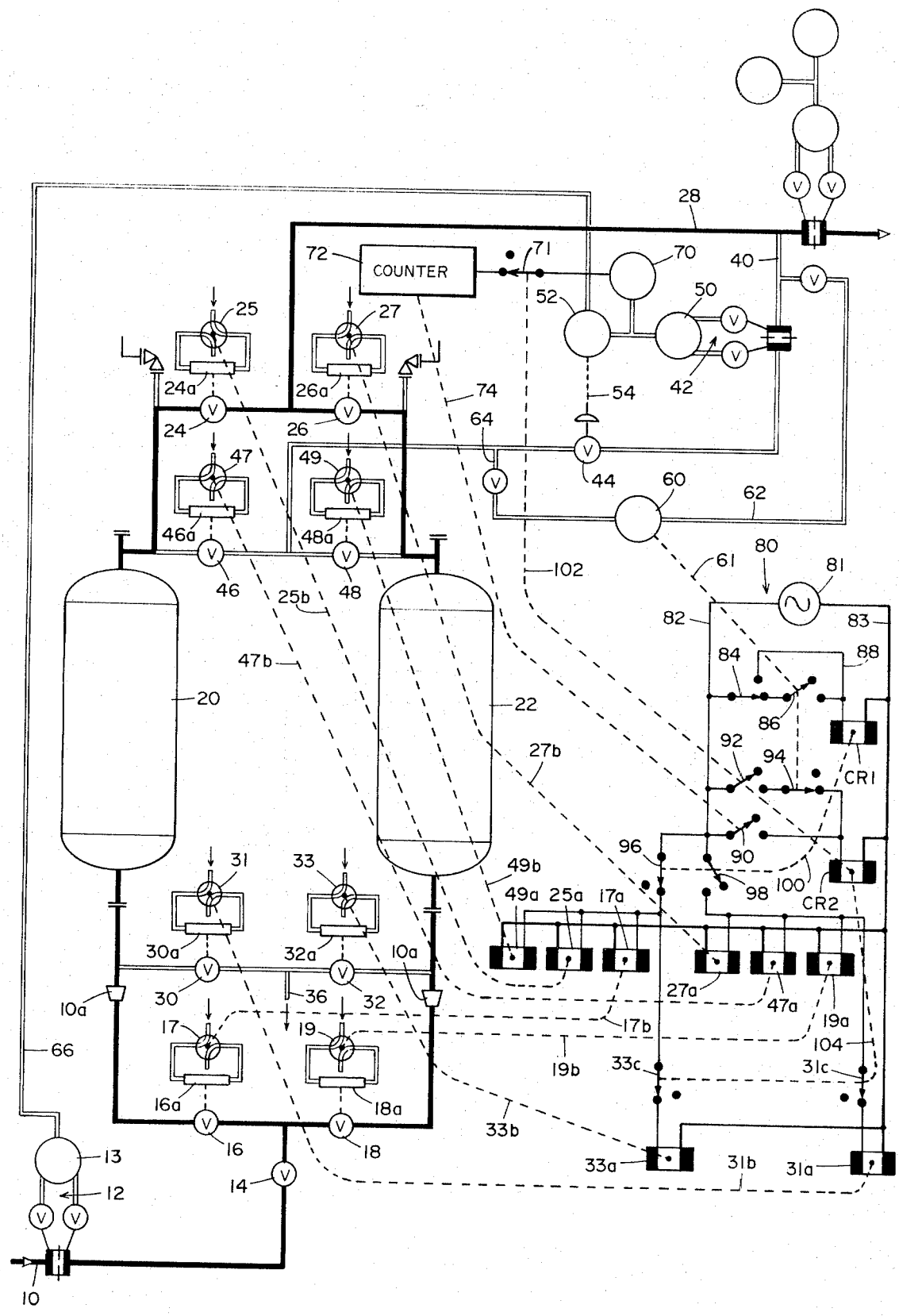

ADSORPTION CONTROL

This invention relates to gas purification wherein a continuous flow of gas containing contaminants is to be purified by alternate flow through two adsorbers and delivered at a constant rate.

Hydrogen plants, for example, are operated on a continuous basis with the output used directly as a feed stock to another processing unit. It is necessary in order to supply such feed stock that impurities such as hydrocarbons found in substantial proportions in the hydrogen stream be removed. Preferably a hydrogen stream for many applications must have a purity of 99.999 percent. The product stream from a hydrogen plant frequently has contaminants of the order of 30 percent. Thus, it is a significant problem to clean the gas stream to the requisite purity.

The present invention will be illustrated and described in connection with operations of a hydrogen gas plant wherein a constant flow rate is produced by the plant to be delivered at a constant rate from the plant and from which the contaminants are removed.

It will be understood that the same system may be utilized for purifying streams of gas other than hydrogen, in which case it is necessary to employ the type of adsorbents appropriate for the products.

Representative known methods and systems are shown in U. S. Pat. Nos. 3,101,261 and 3,212,236 in which adsorbers are loaded with material preferentially selective to the contaminants. Gas flow through beds of such material causes contaminant saturation front in the bed to progress through the bed until ability further to extract contaminants is exhausted. When thus exhausted, an adsorber is taken off stream and counterflow of purified gas then is initiated to regenerate the adsorbent.

Prior systems have been characterized by changes in output flow rates as a given adsorber is taken off stream and replaced by another. In other systems changes have been reduced by use of a surge tank in the output line.

The present invention is directed to the simplest of systems, a two adsorber system, in which constant output of flow is maintained without the necessity of a surge tank.

More particularly, in accordance with the present invention gas purification is accomplished in a pair of adsorbers having valved input and output flow lines and valved counterflow and vent lines. The valved input and output flow lines on the first adsorber and the valved counterflow and vent lines on the second absorber simultaneously are actuated in a first sense in response to each appearance of a switching function. The valved input and output flow lines on the second adsorber and the valved counterflow line and the valved vent line on the first adsorber simultaneously are actuated in a second sense opposite the first sense in response to each appearance of a switching function. Gas flow in the counterflow lines is maintained at the rate of a substantially constant faction of the flow from the output lines. Responsive to counterflow of a predetermined gas volume after each switching function, any open valved vent line in the system is closed. Finally, responsive to achieving a near minimum in each cycle of decreasing difference in pressures between the two adsorbers, the switching function is generated simultaneously to switch flow of contaminated gas from a spent adsorber to a regenerated adsorber and to vent and initiate regeneration of the spent adsorber.

In a further aspect, the gas purification system has only a pair of adsorbers each having valved input and output flow lines, a valved counterflow line and a valved vent line. A first control circuit when energized simultaneously actuates in a first sense the valved input and output flow lines on the first adsorber and the valved counterflow and vent lines on the second absorber. A second control circuit when energized simultaneously actuates in a second sense opposite the first sense the valved input and output flow lines on the second adsorber and the valved counterflow line and the valved vent line on the first adsorber. Means responsive to counterflow of the predetermined gas volume after each control circuit energization closes any open valved vent line in the system. Control means responsive to achieving each near minimum in each cycle of decreasing pressure difference between the two adsorbers then alternately switches the control circuits between energized and non-energized states to alternate adsorb and vent-regeneration stages between the two adsorbers while maintaining constant the rate of flow of a purified gas product stream.

For a more complete understanding of the present invention and for further objects and advantages thereof, reference may now be had to the following description taken in conjunction with the accompanying drawing in which:

The FIGURE illustrates an embodiment of the invention for purifying a hydrogen gas stream.

In the FIGURE, a hydrogen gas stream with contaminants therein flows from a hydrogen production plant (not shown) by way of a line 10 and thence past flow metering unit 12, valve 14 and control valves 16 and 18 to vessels 20 and 22, respectively. The flow of high purity gas from the adsorbers is then delivered by way of valves 24 and 26 for such use as may be desired by way of the output flow line 28. Valves 16, 18, 24 and 26 are selectively actuated alternately to flow gas to be purified through adsorbers 20 and 22.

The adsorbers 20 and 22 are loaded with conventional adsorbents, such as charcoal, zeolites or other materials, which provide sites upon which the contaminants in the hydrogen gas stream will adsorb and thus be removed.

Typically, the adsorbers are vertical tanks of 2 feet diameter and 12 feet in length. Such system may be pressurized to about 200 p.s.i. with flow rates such that the adsorber would be loaded with contaminants in 8 to 10 minutes. Thus, it is necessary to switch flow in line 10 alternately from one absorber to another on a cycle of 8 to 10 minutes and to regenerate the adsorbent material in the off stream adsorber on the same cycle before replacing it on stream.

Heretofore, systems have been employed using four or more adsorbers. The use of four such adsorbers has been dictated by the fact there are four discrete stages in each cycle of operation. The stages may be defined as follows:

1. the adsorption stage during which the product from line 10 flows through the adsorber to remove the contaminants;

2. the vent stage during which gas in the adsorber at the high operating pressure is vented, reducing the pressure to about atmospheric pressure;

3. the regeneration or purge state during which contaminants removed during the first stage from the gas stream are purged from the adsorbent material by back flow of purified output gas at low pressure; and 4. the repressurization stage in which the adsorber is brought up to high pressure preparatory to switching it back on stream.

The present invention is directed to carrying out the foregoing operation with only two adsorbers 20 and 22, thereby materially minimizing the amount of equipment necessary for a given installation. Significantly, the operation is so controlled that the flow in the output line 28 remains a constant. Heretofore, systems with more than two absorber vessels have been used for a constant output, and even they, in many cases, have required the addition of a surge tank in the output line in order that a constant flow rate could be delivered from the system. A surge tank is not required in the present system.

Referring again to FIG. 1, the control system includes vent valves 30 and 32 leading from tanks 20 and 22, respectively, to a line 36. Line 36 leads to a suitable storage facility where the materials removed from the adsorbers may be disposed of either as fuel in a processing system or otherwise. The function of valves 30 and 32 is to provide a channel to reduce the pressure in the associated adsorber from the high operating pressure to a low pressure, near atmospheric. In one installation where line 10 was of 1 inch diameter the vent lines were of 2 inch diameter, the change in diameter being signified by symbols 10a.

In order to purge and repress the off stream adsorber, there is provided a line 40 leading from line 28 with a metering unit 42 in a return gas flow loop. The loop leading from the metering unit 42 includes a flow control valve 44 whose output then passes by way of valves 46 and 48 to the top of tanks 20 and 22, respectively. A flow transmitter 50 is included in the measuring unit 42 responsive to the pressure drop across a metering orifice in unit 42 to indicate the flow rate in line 40. The flow transmitter 50 is coupled to a controller 52 which is linked by way of linkage 54 to valve 44 to vary the setting of valve 44 such that the flow rate in line 40 is constant even though the pressure in the off stream adsorber varies radically during the vent, purge and repress stages, assuming constant flow in line 10.

A control system is provided which is responsive to the output of the flow transmitter 50 for operating valves 30, 32, 46 and 48 will be described. In addition, a differential pressure switch actuator 60 is connected at one input by way of line 62 to a point in line 40 upstream of the measuring unit 42. It is connected at the second input thereof by way of line 64 downstream of valve 44. The differential pressure switch 60 serves to control the instant at which switch over valves 16, 18, 24 and 26 operate to change flow from adsorber 20 to adsorber 22 and vice versa.

Operation of the system is based upon the fact that the purge stage in each cycle requires flow through an off stream adsorber of about the same volume of gas to remove the impurities adsorbed as the volume which flowed through the adsorber during the on stream or adsorption stage. However, the purge stage is operated at pressure near atmospheric pressure whereas the adsorption stage is operated at very high pressure of the order of 200 p.s.i. Therefore, only a fraction of the quantity of gas must flow through the adsorber during the purge stage as is delivered to line 16 during the adsorption stage.

More particularly, the ratio of flow in line 10 to the flow in line 40 is fixed. It is determined by reference to the flow dependent pressure function produced by transmitter 13 in unit 12. Line 66 is connected to apply the reference pressure function to an input of controller 52. The second input of controller 52 is connected to flow transmitter 50. As above noted, controller 52 varies valve 44 such that the ratio of the flow rate through the valve 44 to the flow rate in the line 10 is a constant. The pressure output function applied by way of line 66 to the flow ratio controller 52 provides a set point for operation of the valve 44.

Flow transmitter 50 is connected to a flow integrator 70. Flow integrator 70 produces electrical output pulses spaced in time proportion to flow rate in line 40. The electrical pulses are applied by way of switch 71 to a counter 72. Counter 72 is of a type which is adjustable to provide a mechanical actuation as by way of linkage 74 upon the receipt of a predetermined number of pulses applied thereto by way of switch 71.

Valves 16, 18, 24, 26, 30, 32, 46 and 48 are pneumatically actuated valves actuated by pneumatic cylinders 16a, 18a, 24a, 26a, 30a, 32a, 46a and 48a, respectively. The latter cylinders are operated under the control of four-way pilot valves 17, 19, 25, 27, 31, 33, 47 and 49, respectively. Pilot valve 17, for example, is illustrated in a position with valve 16 controlled by actuator 16a in an open position. Pilot valve 19 is shown in position with valve 18 closed. Similarly, pilot valve 25 is shown in position with valve 24 open and pilot valve 27 is shown in position with valve 26 closed. In this condition, the flow of gas from line 10 passes through adsorber 20. Valve 46 is closed under control of pilot valve 47 whereas valve 48 is under control of valve 49 so that flow from line 40 passes downward through adsorber 22. Valve 31 has valve 30 closed and valve 33 has valve 32 open so that gas flowing out of adsorber 22 is vented by way of line 36 to a storage or utilization system. Typically, the product in line 36 is utilized for fuel in a related process. However, utilization of this flow does not have any bearing on the present invention.

The system thus far disclosed operates in response to an electrical control system 80 wherein control power is supplied by an alternating current source 81. The control system includes two lines 82 and 83 leading from source 81. A first relay $CR_1$ is connected across lines 82 and 83 in series with a manual selector switch 84. Switch 84 has three positions. In the position shown, the switch is connected in the "automatic" position. In the second position, the system is "off." In the third position, the system is in "manual" operation. The first terminal of switch 84 is connected by way of switch 86 to one terminal of the relay $CR_1$, the second terminal of which is connected to line 83. The third terminal of switch 84 is connected by way of conductor 88 to relay $CR_1$.

A second control relay $CR_2$ is connected between conductors 82 and 83 by way of two circuits. The first circuit includes a normally open switch 90. Switch 90 is a two-position switch with one terminal connected to one terminal of $CR_2$. The other terminal of $CR_2$ is connected to line 83.

The second circuit leading to relay $CR_2$ includes two switches 92 and 94 which are connected in series and together form a circuit connected in parallel to switch 90. Switch 92 is normally open and switch 94 is normally closed.

Line 82 is also connected to a pair of switches 96 and 98. Switch 96 is shown in the closed position with switch 98 in the open position. Switches 96 and 98 provide for alternately energizing two sets of four solenoids each. The solenoids thus energized control the positions of the pilot valves 17, 19, 25, 27, 31, 33, 47, and 49. More particularly, when switch 96 is closed and switch 98 is open, solenoids 17a, 25a, 33a and 49a are energized. When switch 98 is closed and switch 96 is open, solenoids 19a, 31a, 27a and 47a are energized.

Solenoid 17a is connected by way of mechanical linkage 17b to pilot valve 17. Solenoid 25a is connected by way of mechanical linkage 25b to pilot valve 25. Solenoid 33a is connected by way of linkage 33b to pilot valve 33. Solenoid 49a is connected by way of linkage 49b to valve 49. Solenoid 19a is connected by way of linkage 19b to pilot valve 19. Solenoid 31a is connected by way of linkage 31b to pilot valve 31. Solenoid 27a is connected by way of linkage 27b to pilot valve 27, and solenoid 47a is connected by way of linkage 47b to pilot valve 47.

Switch 33c is connected in series with switch 96 in the line leading to solenoid 33a so that solenoid 33a can be disconnected or deenergized independently of solenoids 17a, 25a and 49a. In a similar manner, switch 31c provides for independent deenergization of solenoid 31a.

Control relay $CR_1$ is connected by way of linkage 100 to switches 96 and 98. Control relay $CR_2$ is connected by way of linkage 102 to switch 71 and by way of linkage 104 to switches 31c and 33c. The differential pressure sensor 60 is connected by way of linkage 61 to switches 86 and 94.

Having described the construction of the electrical control system and its relation to the valve system, the operation will now be described. It will be assumed that at the outset switch 86 is open, switch 94 is closed with flow from line 10 just having been switched from adsorber 22 to adsorber 20 by closing valve 18 and opening valve 16. Relay $CR_1$ is a latching relay of the impulse type. The application of an impulse to relay $CR_1$ has just closed switch 96 and opened switch 98. In this condition, solenoids 17a, 25a, 33a and 49a are energized so that valves 16, 24, 32 and 48 are open. Valves 18, 26, 30 and 46 are closed.

ADSORPTION STAGE

Gas flow from line 10 then continues through adsorber 20 during the adsorb stage. Hydrogen gas 99.999 percent pure then emerges from adsorber 20 through line 28.

PURGE STAGE

When valve 32 opens at the instant of closure of switch 96, high pressure gas in adsorber 22 is vented through line 36 to low or atmospheric pressure.

REGENERATION STAGE

Valve 44 is set so that about 25 percent of the gas flowing in line 28 flows through valve 44 and thence through valve 48 downward through adsorber 22. This flow sweeps out of the adsorber 22 all of the contaminants loaded into it during the preceding adsorption cycle.

Counter 72 having been automatically reset at the beginning of the adsorption cycle proceeds to be incremented in response to transmitter 70 until a predetermined count is accumulated therein. The predetermined count in counter 72 represents a flow of the purified gas through valve 44 into adsorber 22 at low pressure in the same volume as passed upward through adsorber 22 during the adsorption cycle at high pressure. When the predetermined count is reached in counter 72, switch 90 is closed by way of linkage 74.

When the predetermined volume of regeneration gas has passed through adsorber 22, momentary closure of switch 90 by counter 72 energizes relay $CR_2$. This closes switch 92 by way of linkage 102, locking relay $CR_2$ in an energized state until switch 94 is opened. Linkage 102 also serves to open switch 71 to prevent counter 72 from being further incremented during the repressure stage. At the same time, relay $CR_2$ opens switches 31c and 33c through linkage 104. Because switch 98 is open, solenoid 31a was not energized. However, switch 96 was closed and solenoid 33a was energized. Opening switch 33c deenergized solenoid 33a, altering pilot valve 33 to close valve 32, which action marks the beginning of the repressure stage.

REPRESSURE STAGE

With valve 32 closed, flow of gas through valve 44 causes the pressure in adsorber 22 to gradually increase.

CHANGE OVER

When the differential pressure sensed by unit 60 decreases to about 5 p.s.i., adsorber 22 is substantially repressurized, i.e., it is at about 195 p.s.i. Upon reaching this low differential pressure, unit 60 through linkage 61 closes switch 86 and opens switch 94. Since the relay $CR_1$ is an impulse or ratchet type relay, energizing relay $CR_1$ causes switch 98 to close and switch 96 to open. This deenergizes the solenoids 17a, 25a and 49a and simultaneously energizes solenoids 19a, 27a, 31a and 47a. This opens valves 18 and 26 to direct flow through adsorber 22 and opens valves 30 and 46 simultaneously to vent adsorber 20 through valve 30 and initiate flow of regeneration gas through valves 44 and 46.

Unit 60 is such that switches 86 and 94 were actuated only momentarily to energize $CR_1$ and deenergize $CR_2$, respectively. Counter 72 automatically was reset and switch 71 closed at the end of the purge stage. Counter 72 begins to accumulate a new count dependent upon the volume of low pressure gas flowing through valve 44 to absorber 20 only after switch 94 is opened.

In one embodiment of the system, the unit 70 was a Pneumatic Flow Integrator manufactured and sold by the Foxboro Company, Foxboro, Mass., and identified as the 14A-EP Series.

The counter unit 72 was an Electromechanical Count/Control Unit of the type manufactured and sold by Durant, 622 North Cass St., Milwaulkee, Wisc., and identified as Durant 49600 Unisystems Electromechanical Count Control Unit.

The relay $CR_1$ was an impulse ratchet type relay manufactured and sold by Potter and Brumfield, Newark, N.J. and identified as Catalog No. AP11A Impulse Ratchet Relay.

Unit 60 was a double-pole double-throw differential pressure switch set at 5 p.s.i.g. decreasing differential pressure of the type manufactured and sold by The Mercoid Corporation, 628 Davisville Rd., Willow Grove, Pa. and identified as Model No. DPAW-33.

Flow measuring units 12 and 42 were of the type manufactured and sold by Daniel Industries, 9720 Katy Rd., Houston, Tex. and identified as Model No. 520.

The actuators 16a, 18a, 24a, 26a, 30a, 32a, 46a and 48a were of the type manufactured and sold by Jamesbury Corporation, 640 Lincoln St., Worcester, Mass. and identified as Model No. ST50.

In a system of the foregoing type, the adsorbers are designed as to size, adsorbent and flow lines in the light of the capacity of the plant producing the input to line 10, the quality of its product, and the requirements of the unit utilizing the product from line 28. The setting of the counter 72 is predetermined in dependence upon the volume of high pressure gas required to exhaust the capability of a given adsorber to remove further contaminants from the stream. So long as the input in flow of line 10 is constant, the flow through valve 44 will be constant and at a rate which is a fraction of the flow in the line 10. Counterflow of gas through valve 44 is for two purposes. The first purpose is to purge the adsorber to which it is connected at any given time of contaminants therein. Counter 72 begins its count simultaneously with each energization of relay $CR_1$ by unit 60. Counter 72 measures the volume of gas passing into an adsorber for purging purposes and actuates switch 90 at the end of each such count. Upon closure of switch 90 by counter 72, switches 31c and 33c are open. This action closes any open vent line, i.e., valve 30 or valve 32. Relay $CR_2$ is held closed by current flow through switch 92 until switch 94 is opened by unit 60. In practice, the interval between closure of switch 90 and opening of switch 94 will be roughly twice the time interval required to purge a given adsorber. More particularly, the time required to repressure a given adsorber is close to twice the time required to purge. For this reason, switch 71 must be open during the repressuring operation so that counter 72 will accumulate count only during the purge stage.

In actual practice, the rate of flow in output line 28 has been maintained constant while switching adsorbers on and off stream from and to the regeneration stream. Measurements have shown that a momentary pressure pulse is experienced at the instant of change over but that for all purposes, the rate of flow is constant.

While the system has been shown as being controlled by an electrical control system which serves to actuate pilot valves in the system, it will be understood that different forms of electrical networks may be employed for achieving the same results and further, pneumatic logic systems may be employed to substantially duplicate the functions performed by the control system 80 and thus operate a gas purification system without using the electrical components shown in the FIGURE. However, it is intended to cover all modifications as fall within the scope of the appended claims.

What is claimed is:

1. In a gas purification system wherein a pair of adsorbers are adapted to purify a flow of contaminated gas, each adsorber having valved input and output flow lines, a valved counterflow line and a valved vent line, the combination which comprises:
    a. a first control path which when energized simultaneously actuates in a first sense the valved input and output flow lines on the first of said adsorbers and the valved counterflow and vent lines on the second of said adsorbers,
    b. a second control path which when energized simultaneously actuates in a second sense opposite said first sense the valved input and output flow lines on the second of said adsorbers and the valved counterflow line and the valved vent line on the first of said adsorbers,
    c. means to maintain gas flow in said counterflow line at a substantially constant fraction of the flow from said output line,
    d. means responsive to counterflow of a predetermined gas volume following each energization of the control path for closing any open valved vent line in said system, and
    e. means responsive to a near minimum in each cycle of decreasing pressure difference between said two adsorbers alternately to switch said control paths between energized and non-energized states.

2. The combination set forth in claim 1 wherein said control paths are electrical.

3. The combination set forth in claim 1 wherein said first and second control paths comprise electrical relay controlled switch means.

4. The combination set forth in claim 1 wherein flow dependent pressure transmitters are provided on said input line and on said counterflow line and wherein a proportioning valve is responsive to said pressure transmitters to control flow in said counterflow line.

5. The combination set forth in claim 3 wherein means are provided to produce and to count electrical pulses generated at a rate proportional to flow in said counterflow line, and means responsive to each preset count to close said open vent valve.

6. Control means for two gas adsorbers interconnected for flow from an input line through said adsorbers to an output flow line for delivery of the least adsorbed fraction of the input stream in purified form and wherein a given volume of input gas at high pressure so exhausts the ability of the adsorbent in a given adsorber as to require regeneration of said adsorbent, which comprises:
    a. a control valve connected from said output flow line to valved counterflow inputs at one end of each said adsorber and adapted to maintain counterflow at a constant fraction of the flow in said input line,
    b. a valved vent at the other end of each said adsorber,
    c. means operative upon initiation of flow through one adsorber to vent and initiate counterflow of said fraction of the purified gas from said output flow line through said control valve to the other adsorber,
    d. a gas volume integrating controller connected to close said vent on said other adsorber when the volume of regeneration gas flowing through said other adsorber at the low pressure therein about equals said given volume, and
    e. means including differential pressure means connected across said control valve and operative at a predetermined low decreasing pressure differential simultaneously to substitute one said adsorber for the other in each of said input gas stream and said counterflow stream and to vent the adsorber in the counterflow gas stream.

7. In gas purification wherein a pair of adsorbers serve to purify a high pressure flow of contaminated gas with each adsorber having valved input and output flow lines and valved counterflow and vent lines, the method which comprises:

a. simultaneously actuating in a first sense in response to each appearance of a switching function the valved input and output flow lines on the first said adsorber and the valved counterflow and vent lines on the second of said adsorbers, b. simultaneously actuating in a second sense opposite the first sense in response to each appearance of a switching function the valved input and output flow lines on the second of said adsorbers and the valved counterflow line and the valved vent line on the first of said adsorbers, c. flowing gas in said counterflow lines at a rate of a substantially constant fraction of the flow from said output line, d. responsive to counterflow of a predetermined gas volume, closing any open valved vent line in said system, and e. responsive to a near minimum in each cycle of decreasing pressure difference between said two adsorbers generating said switching function simultaneously to switch flow of contaminated gas from a spent adsorber to a regenerated adsorber and to vent and initiate regeneration of the spent adsorber.

8. The method of claim 7 wherein said switching functions are closures of circuits through a latching relay.

9. In a system for purifying a contaminated gas stream to deliver a constant flow of purified gas, the combination which comprises:

a. first and second adsorbers, each adapted to remove contaminants from said gas stream and adapted to be regenerated by counterflow of purified gas therethrough, b. means for simultaneously
   i. initiating flow of said contaminated gas stream through said first adsorber,
   ii. venting said second adsorber to low pressure, and
   iii. initiating counterflow through said second adsorber of a fraction of the stream of purified gas flowing from said first adsorber, c. means for closing the vent of said second adsorber when the volume of purified counterflow gas at said low pressure equals that volume of contaminated through said first adsorber which about exhausts the ability of said first adsorber to remove further contaminants thereby to initiate repressurization of said second adsorber, and d. means responsive to the rise in pressure in said second absorber to a predetermined pressure near the pressure in said first adsorber to switch flow of said gas stream from said first adsorber to said second adsorber and to simultaneously vent said first adsorber and initiate counterflow of regeneration gas through said first adsorber.

10. In a gas purification system wherein a pair of adsorbers are adapted to purify a flow of contaminated gas, each adsorber having valved input and output flow lines, a valved counterflow line and a valved vent line, the combination which comprises:

a. a first control circuit which when energized simultaneously actuates in a first sense the valved input and output flow lines in the first of said adsorbers, and the valved counterflow and vent lines in the second of said adsorbers, b. a second control circuit which when energized simultaneously actuates in a second sense opposite said first sense the valved input and output flow lines on the second of said adsorbers and the valved counterflow line and the valved vent line on the first of said adsorbers, c. means to maintain gas flow in said counterflow line at a substantially constant fraction of the flow from said output line, d. means responsive to counterflow of a predetermined gas volume following each energization of said control circuit for closing any open valved vent line in said system, and e. means responsive to a near minimum in each cycle of decreasing pressure difference between said two adsorbers alternately to switch said control circuits between energized and non-energized state.

11. In a gas system wherein a pair of adsorbers are adapted to purify a flow of contaminated gas, each adsorber having valved input and output flow lines, a valved counterflow line and a valved vent line, the combination which comprises:

a. a source of electrical control power, b. a pulse type ratchet relay having two paths connected to said source and adapted to be alternately latched closed, c. a first set of solenoids connected to be energized through one of said paths of said relay with solenoids of said first set coupled to actuate the valved input flow line on the first adsorber, the valved output flow line on said first adsorber, the valved counterflow line on the second adsorber, and the valved vent line on the second adsorber, d. a second set of solenoids connected to be energized through a second of said paths of said relay with solenoids of said second set coupled to actuate the valved input flow line on the second adsorber, the valved output flow line on said second adsorber, the valved counterflow line on the first adsorber, and the valved vent line on the first adsorber, e. a counter connected to accumulate a count proportional to flow in said counterflow line during each interval that a valved vent line is open, f. two differential pressure actuated switches, one adapted to close and one adapted to be opened each time the differential pressure between said adsorbers decreases to a preset minimum, g. a second relay energized at the end of each said interval and connected to open said two paths to de-energize solenoids selectively to close any open vent line and deactivate the input to said counter so long as said second relay is energized, and h. a relay energizing circuit on said second relay latched closed by said second relay and adapted to be opened simultaneously with energization of said ratchet relay to de-energize said second relay.

* * * * *